Patented Nov. 3, 1942

2,300,439

UNITED STATES PATENT OFFICE 2,300,439

STABLE MIXTURES CONTAINING LEVO-ASCORBIC ACID OR THE LIKE

Gerrit van der Lee, Deventer, Netherlands

No Drawing. Application September 21, 1937, Serial No. 164,989. In the Netherlands October 1, 1936

8 Claims. (Cl. 99—91)

For several years oxidizing agents of which the peroxides, persulphates and bromates may be particularly mentioned, have been used for the treatment of flour, meal and similar milling products, in order to improve the baking quality of the same. It has recently been found by my co-workers, that levo-ascorbic acid, ascorbates and isoascorbates are also suitable flour treating agents. These new preparations are entirely different from the oxidizing agents used hitherto, since l-ascorbic acid and the like are very strong reducing agents, and possess the property of easily decomposing, by absorption of oxygen thereby becoming oxidized.

The oxidation, of course, takes place particularly if the l-ascorbic acid, or the like, (which are solid substances) which, are exposed to the air in a finely divided state and particularly if ground to the fineness of flour with a filler. On the other hand it is necessary to use the ascorbic acid etc., in a finely divided condition, for the treatment of flour, since otherwise it is difficult or impossible to uniformly mix them with the flour that is also a very fine powder. The mixture to be added to the flour is usually to be added in a very small amount. Accordingly, substances had to be found that were suitable to stabilize l-ascorbic acid etc., especially when in a finely divided state. These substances, moreover, had to possess such properties, that the mixtures maintained their crumbling, clot-free non-lumping texture and did not ball together also when they were kept for a rather long time, since otherwise they would not be suitable for the addition to flour and the like by means of mechanical apparatus.

Surprisingly, I have now found that stable mixtures containing l-ascorbic acid and/or other substances as mentioned herein, can be successfully prepared, if these substances are mixed with one or more non-hygroscopic materials, which preferably themselves are neither easily oxidizable nor easily reducible. It could not have been expected that in this way stable mixtures could be obtained, since the contact of the ascorbic acid, etc., with the air is still increased by the distribution over the non-hygroscopic materials and accordingly a stronger oxidation would have been expected. It must be supposed that small quantities of moisture causing a commencement of deliquescence to arise with the materials used for mixing with the l-ascorbic acid and the like, initiate a decomposition thereof, and that this decomposition is avoided by the mixing with the non-hygroscopic material. In accordance therewith is the fact that materials that are themselves relatively inert to oxidizing and reducing agents and, which moreover, are non-hygroscopic, which is desired for the application according to this process, are more useful than substances that are easily oxidized or reduced and/or which are hygroscopic. The decomposition of ascorbic acid by oxidation is apparently accelerated by other oxidation reactions, taking place simultaneously, of substances that are, like the ascorbic acid, present in the liquid film round the particles. So it was, for example, found that malt flour that is relatively little hygroscopic, is less suitable for the preparation of stable mixtures with ascorbic acid and the like than, for example, starch, probably because malt flour contains various easily oxidizable substances, whereas starch is relatively resistant to oxidation.

Thus it will be apparent that the presence of products promoting the oxidation or reduction phenomena, must be avoided as fully as possible. It is, for example, desirable to exclude even traces of salts of catalytically acting metals (e. g. copper salts) that accelerate the oxidation of ascorbic acid to a very high degree. The same applies to enzymes that induce oxidation, such as the oxidases and peroxidases.

On the other hand it is not necessary that the added materials should be anhydrous, for example, I have found that crystallized dicalcium phosphate ($CaHPO_4.2H_2O$) in a finely powdered state, is excellently useful. Owing to its calcium and phosphorus content, this substance offers advantages both from a hygienic and from a baking technical point of view.

Also various other materials are suitable for such mixtures, according to the present invention. As examples tricalcium phosphate, gypsum, silicic acid in various forms (including also diatomaceous earth, talc, magnesium carbonate, potassium sulphate, wheat-, rice-, maize-, potato-starch, and the like, may be mentioned as examples of useful materials for this purpose. Mixtures of these can also be used.

I have further found that it is possible to substitute a portion (preferably a minor fraction) of the non-hygroscopic material in the mixtures by another addition which, if used alone with the ascorbic acid etc., would induce oxidation thereof, giving mixtures of a more or less good keeping quality if mixed with l-ascorbic acid and the like. Thus, it was possible, for example, to obtain products of excellent keeping quality by mixing dicalcium phosphate, malt flour and l-ascorbic acid. In the same way other products that in themselves are less suitable, such as wheat flour, bean flour, sugar, common salts, etc., may be made suitable to be incorporated in mixtures containing l-ascorbic acid and the like. In these cases the non-hygroscopic substance apparently exercises such a stabilizing action that also the mixtures in which the substances are present that promote the decomposition of the l-ascobic acid and the like, acquire a good keeping quality.

The process according to the invention may finally be explained by the aid of the following examples, to which the invention is not restricted.

*Example 1*

1 part of l-ascorbic acid is mixed with 99 parts of magnesium carbonate.

*Example 2*

5 parts of sodium ascorbate are mixed with 95 parts of talc.

*Example 3*

5 parts of l-ascorbic acid are mixed with 95 parts of dicalcium phosphate.

*Example 4*

20 parts of sodium isoascorbate are mixed with 80 parts of kieselguhr.

*Example 5*

5 parts of l-ascorbic acid are mixed with 50 parts of dicalcium phosphate and 45 parts of wheat middlings.

*Example 6*

7 parts of sodium isoascorbate are mixed with 63 parts of talc and 30 parts of malt flour.

*Example 7*

5 parts of l-ascorbic acid are mixed with 95 parts of wheat starch.

*Example 8*

10 parts of l-ascorbic acid are mixed with 90 parts of maize starch (corn starch).

*Example 9*

5 parts of sodium ascorbate are mixed with 70 parts of maize starch and 25 parts of malt flour.

Preferably the agent according to my invention is brought to about the same degree of fineness as the flour, meal or other like milling products with which it will be mixed. The various constituents of the agent, as far as they need any grinding, may either be ground to the desired degree of fineness before mixing, or the materials may be ground after mixing. Finally it is also possible to combine the grinding and mixing operation by a treatment in a suitable grinder, e. g. in a ball mill.

The term "substance which includes the acid radical of an ascorbic acid" as used in the appended claims, is intended to include l-ascorbic acid in the free state as well as in the combined state (i. e. l-ascorbates) and isoascorbates.

While I have above mentioned the use of certain specific starches, starch broadly, can be used.

It will be noted that all the substances named above, are harmless, non-toxic substances, in the amounts used.

I claim:

1. A finely pulverulent agent for treating flour, meal and other like milling products, which comprises a pulverulent mixture containing ascorbic acid in admixture with at least several times its own weight of a harmless non-toxic finely pulverulent solid material other than that to which such agent is to be added, and which material is substantially inert as regards oxidation and reduction, is substantially non-hygroscopic, and which is substantially devoid of such enzymes and catalysts as would accelerate oxidation of said ascorbic acid by the atmosphere.

2. A finely pulverulent agent for treating flour, meal and other like milling products, which comprises a pulverulent mixture containing a finely pulverulent solid substance which contains the acid radical of an ascorbic acid, in admixture with a harmless non-toxic finely pulverulent solid material other than that to which such agent is to be added, and which material is substantially inert as regards oxidation and reduction, is substantially non-hygroscopic, and which is free from enzymes and catalysts which would accelerate oxidation of said substance containing said acid radical, by the atmosphere.

3. A finely pulverulent agent for treating flour, meal and other like milling products, which comprises a pulverulent mixture containing a finely pulverulent solid substance which includes the acid radical of an ascorbic acid, in admixture with several times its own weight of a harmless non-toxic finely pulverulent solid material other than that to which such agent is to be added, and which material is substantially inert as regards oxidation and reduction, is substantially non-hygroscopic, and which is free from such enzymes and catalysts as would accelerate oxidation of said substance by the atmosphere.

4. A finely pulverulent agent for treating flour, meal and other like milling products, which comprises a pulverulent mixture containing ascorbic acid in admixture with a much greater amount of a harmless non-toxic pulverulent solid material which is substantially inert as regards oxidation and reduction, is substantially non-hygroscopic, and which is substantially devoid of such enzymes and catalysts as would accelerate oxidation of organic bodies by the atmosphere, and substantially devoid of such enzymes and catalysts as would accelerate reduction of organic bodies.

5. A finely pulverulent solid agent for improving flour, meal and like milling products which comprises (a) a pulverulent solid substance selected from the group consisting of l-ascorbic acid and non-toxic salts thereof and non-toxic isoascorbates, (b) a larger amount of an addition which is a harmless non-toxic edible pulverulent solid material which, if added alone to said substance (a) would accelerate oxidation thereof by the atmosphere and (c) a still larger amount of a harmless non-toxic pulverulent solid material which is substantially inert as regards oxidation and reduction, is substantially non-hygroscopic, and which is substantially free from such enzymes and catalysts as would accelerate the oxidation of said substance (a) by the atmosphere, such agent being stable in storage.

6. A finely pulverulent solid agent suitable for addition to flour, meal and analogous milling products, which comprises a substance which contains the acid radical of an ascorbic acid, mixed with many times its own weight of at least one pulverulent solid material selected from the group consisting of dicalcium phosphate, tricalcium phosphate, gypsum, silicic acid, kieselguhr, talc, magnesium carbonate, potassium sulphate, and starch, and with an intermediate amount of at least one addition which is a pulverulent solid material that, if added alone to such substance containing ascorbic acid radical would accelerate decomposition thereof, such agent being substantially stable in storage, and capable of improving the baking quality of flour, meal and milling products, when added thereto.

7. A finely pulverulent solid agent suitable for addition to flour, meal and analogous milling products, which comprises a substance which contains the acid radical of an ascorbic acid, mixed with many times its own weight of at least one pulverulent solid material selected from the group consisting of dicalcium phosphate, tricalcium phosphate, gypsum, silicic acid, kieselguhr, talc, magnesium carbonate, potassium sulphate and starch, such agent being substantially stable in storage, and being capable of improving the baking quality of flour, meal and analogous milling products when added thereto.

8. A finely pulverulent agent for treating flour, meal and other like milling products, which comprises a pulverulent mixture containing a pulverulent substance which contains the acid radical of an ascorbic acid, in admixture with a harmless non-toxic pulverulent solid material other than that to which such agent is to be added, and which material is substantially inert, as regards oxidation and reduction, is substantially non-hygroscopic, and which is free from such enzymes and catalysts as would accelerate oxidation of said substance containing said acid radical by the atmosphere, together with another pulverulent solid material which if added alone to said substance containing the ascorbic acid radical, would accelerate oxidation of said substance.

GERRIT van der LEE.